Figure 1:
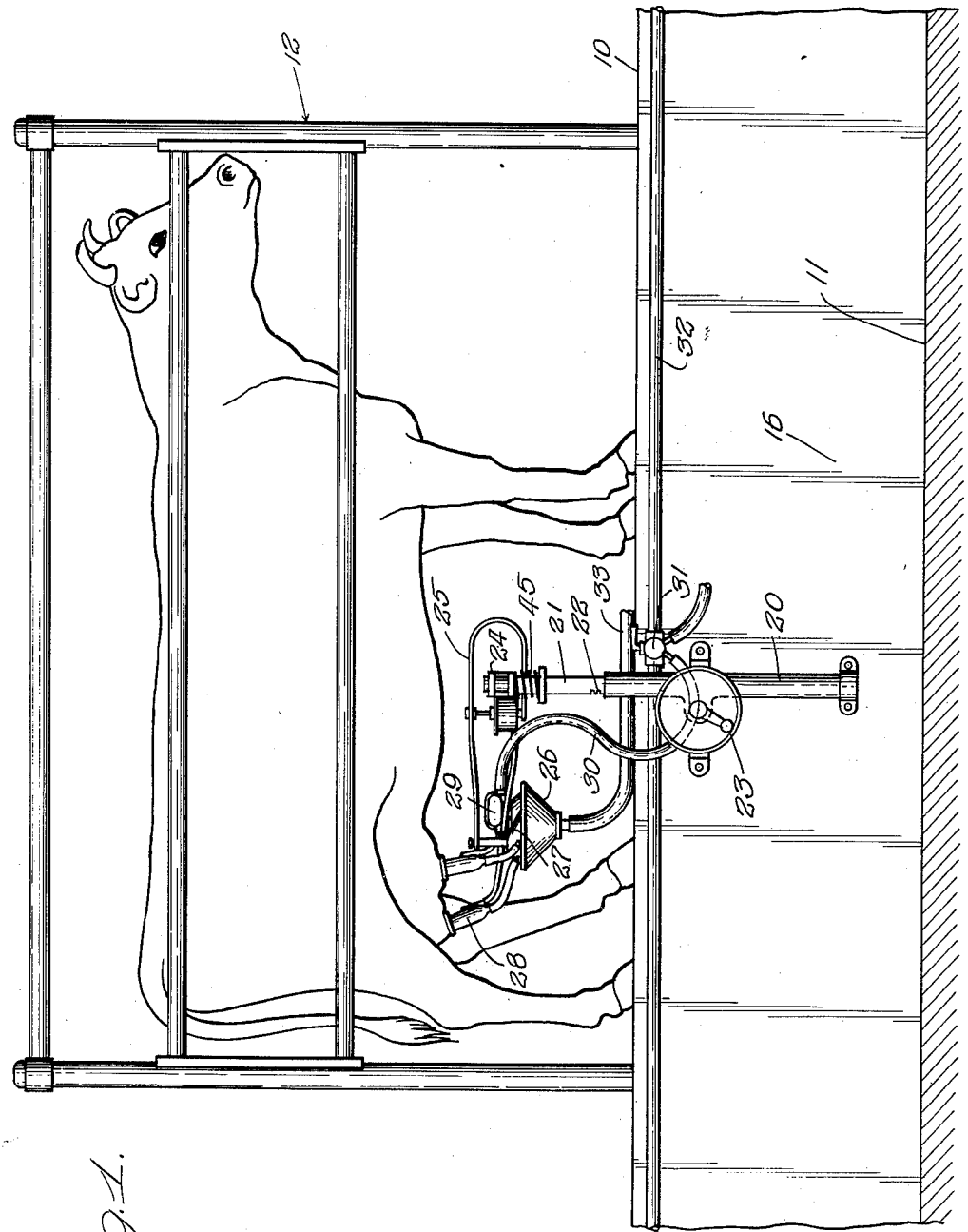

Oct. 14, 1952 H. B. BABSON 2,613,636
SUPPORT FOR MILKING APPARATUS
Filed June 30, 1950 3 Sheets-Sheet 1

Inventor:
Henry B. Babson,
By Schroeder, Merriam,
Hofgren & Brady, Attys.

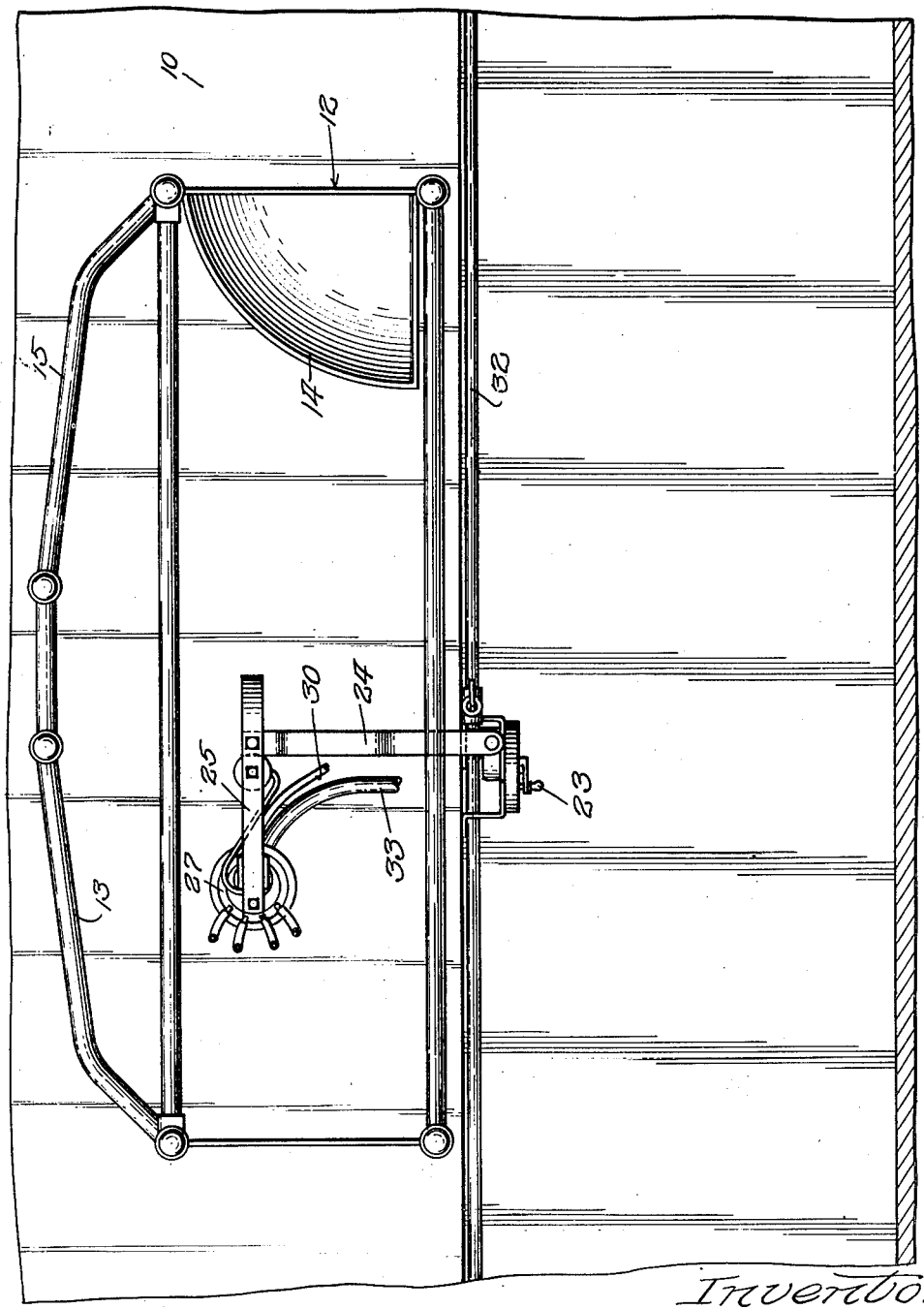

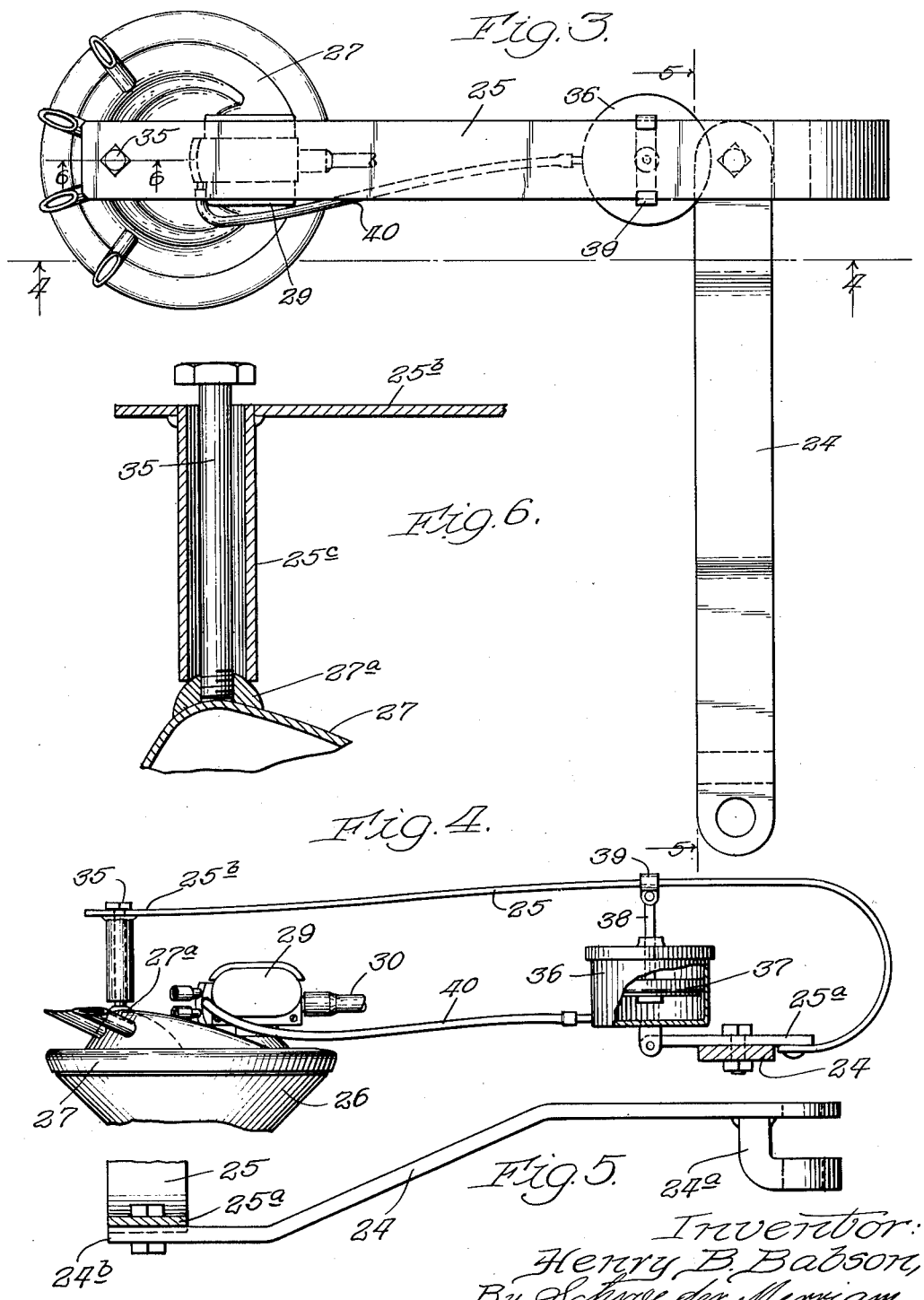

Patented Oct. 14, 1952

2,613,636

UNITED STATES PATENT OFFICE 2,613,636

SUPPORT FOR MILKING APPARATUS

Henry B. Babson, Chicago, Ill., assignor to Babson Bros. Co., a corporation of Illinois Application June 30, 1950, Serial No. 171,380

9 Claims. (Cl. 119—14.13)

1

This invention relates to a support for milking apparatus, and more particularly to a support especially designed for use in a parlor stall and adapted to provide a positive or "live action" tug and pull during the milking.

One feature of this invention is that it provides an improved supporting arrangement for milking apparatus of a kind designed to be used in a parlor stall and to deliver the milk through a milk tube to any desired delivery point, whether it be the ultimate milk can for pick-up from the farm, or sanitary piping to a holding tank, a cooler, or other equipment; another feature of this invention is that it provides, in parlor stall milking apparatus of a kind not having a bucket, milking advantages of the kind so thoroughly proven by a suspended milker of the character shown in McCornack Patent 1,859,213, for example; a further feature is that this support arrangement retains the advantages of live action in milking without the necessity of handling a relatively heavy and large bucket of the kind used in the ordinary barn where the milker is moved from cow to cow down an aisle; yet another feature of this invention is that the intermittent tug and pull provided by this support arrangement may have a greater or lesser amount of forward component, and is positive and definite in its live action during milking; a further feature of this invention is that the tug and pull may be co-ordinated with the squeeze and release action of the inflations within the teat cups in order to avoid any possibility of creeping; and other features and advantages will be apparent from the following specification and the drawings, in which:

Figure 1 is a side elevational view of a portion of a milking parlor installation, showing one stall having my improved support arrangement associated therewith; Figure 2 is a top plan view of the portion of a milking parlor illustrated in Figure 1, only a single stall being shown for simplicity of illustration, although it will be understood that there would normally be several such stalls in a milking parlor; Figure 3 is an enlarged top plan view of my supporting arrangement and a portion of the milking apparatus carried thereby; Figure 4 is a side elevational view taken substantially along line 4—4 of Figure 3; Figure 5 is a fragmentary vertical elevational view along the line 5—5 of Figure 3; and Figure 6 is an enlarged fragmentary vertical detailed view of the connection between the support arm and the milking apparatus.

In the particular embodiment of the invention as illustrated herewith, reference will now be had first to Figures 1 and 2. A milking parlor normally comprises at least 3 stalls, and sometimes more, arranged on a "cow floor," with an "operator's floor," or operator's working space, at a somewhat lower level. In the attached drawings, the cow floor carrying the stalls is identified as 10, with the associated operator's floor being identified as 11. One only of a plurality of parlor stalls is illustrated (this being here identified in general as 12), and this in a simplified form, without some of the operating levers and other attachments normally used, but which would tend to conceal and confuse the illustration of the support apparatus with which this application is particularly concerned. Reference may be had to my earlier Reissue Patent No. 22,657 and to copending Thomas application Ser. No. 522,883, which issued as Patent No. 2,528,255 on October 31, 1950, for example, for a more complete description of milking parlors and stalls of the character with which we are here concerned.

For the purposes of this application it is believed sufficient to state that the gate 13 is adapted to be swung open in appropriate manner to permit a cow to enter the stall 12, where she is milked, preferably while being fed a grain supplement or the like from the feed hopper 14. After the milking is completed the milking apparatus and support arrangement may be swung out of the way toward the side of the parlor stall, swinging forwardly and to the side of the stall in so doing, and the cow may then be permitted to leave the parlor stall by opening of the gate 15 by suitable apparatus. Another cow is then permitted to enter the stall, the milking apparatus placed in operative position and the procedure repeated. Milk thus withdrawn may be delivered by the milking apparatus to any desired point; as a representative example, this may comprise delivery directly to a milk can for trucking to the milk plant as illustrated in said Thomas patent; or it may comprise delivery to stainless steel tubing for piping to a holding tank, a surface cooler, or any other desired apparatus of the type used in the handling of milk.

Referring now more particularly to the supporting apparatus for the milker, a support arrangement is here shown as comprising a fixedly mounted standard 20, here shown as bolted to the vertical wall 16 separating the cow floor from the operator's floor. Telescopically mounted within this tubular member 20 is a vertically adjustable member 21 having rack teeth 22 on one side thereof adapted to cooperate with a pinion gear which may be manually rotated by the crank 23. This member 21 is adapted to have pivotally mounted at the top thereof a transverse or horizontally extending arm 24, adapted to be spring urged so that the end under the center of the cow is continuously urged forwardly of the cow during milking, this being effected by the spring 45. The general principles of construction of such a support are illustrated and claimed in my Reissue Patent No. 22,368 of August 24, 1943, and accordingly will not be gone into in more detail here. It is to be noted, however, that while the member 20 is here shown as rigidly mounted in a single position for simplicity of illustration, since its mounting forms no part of the present invention, it would normally in practice be mounted in such a manner that it might be horizontally adjustable, as for example in the manner illustrated in my said Reissue Patent No. 22,368.

The milking apparatus illustrated here consists of a small chamber or bowl 26, of sufficient size to make a break in the flow of fluid therethrough, provided with an appropriate lid 27 having four teat cup assemblies connected thereto, one such assembly being identified in general as 28. A pulsator 29 provides intermittent periods of vacuum and atmospheric air adapted to be applied between the outer shell and the inner flexible lining member (or inflation) of each teat cup assembly in known and conventional manner. In the particular form illustrated here the pulsator 29 and the interior of the bowl 26 receives vacuum through a tube 30 connected through a suitable cock mechanism 31 to a vacuum pipe 32 adapted to be connected at some point not shown to a suitable vacuum pump and tank. Milk withdrawn from the udder through the milking apparatus illustrated leaves the bowl 26 through the milk tube 33, being then delivered to any desired suitable point or type of apparatus for further handling of the milk.

The improvements with which this application is particularly concerned are those relating to the construction and arrangement of the first and second arms 24 and 25 of the supporting apparatus, to power operated means for causing periodic desired movement of the supporting end of the arm 25 to provide an intermittent tugging and pulling action on the teats (in a downward and forward direction to as much of an extent as may be desired), and to the manner of connection to the milking apparatus. It will be understood that any type of milking apparatus suitable for use in a parlor stall may be supported and activated by the supporting apparatus which comprises the invention to which this application is directed, and that no limitations are to be inferred from anything illustrated herein.

Attention will be now directed more particularly to the details of the supporting apparatus and to the improvements comprised by it, and reference will be now had more particularly to Figures 3 to 6 inclusive.

Referring first more particularly to Figure 5, it will be seen that the first horizontal arm member 24 is provided with a cast portion 24a (or other suitable construction at the end adapted to be pivotally mounted on the vertical element 21) to provide for a substantially rigid connection at that point in the sense that undesired bending or yielding is prevented while the desired pivoting about a vertical axis is permitted. This arm then extends inwardly under the cow (when in operative position for milking), preferably with its other end being droped down to a somewhat lower position than its point of connection with the element 21, this other or outer end being here identified as 24b. Connected to the outer end 24b, but pivotal with respect thereto, is a relatively rigid portion of the arm 25, here identified as 25a. Extending from this and here illustrated as a separate part of the arm (although it will be understood that it could be integral), is the reversely bent spring metal arm 25, which first extends forwardly of the cow, then upwardly and back to terminate in the supporting end 25b. This end is connected to the milking apparatus in a manner which can be best seen in Figures 4 and 6. The connection is preferably such that there is a positive holding of the milking apparatus at all times preventing dropping thereof, as well as being such as is adapted to provide a downward, or downward and forward, force thereon; and with preferably some slight provision for angular movement, although this must be limited. Some such slight angular movement is desirable, however, to permit of a relatively uniform pull on all of the teats even though there is some slight deformation of udder or teat structure. In the particular form illustrated this connection is shown as comprising a downwardly extending tubular portion 25c bearing upon a ball-like or partial-spherical member 27a mounted on the lid 27, prevention of any dropping of the milking apparatus upon release of the teat cups being insured by the use of means such as the bolt 35, which is a sufficiently loose fit within the tube 25c to permit some slight angular movement. As may be best seen from the top view provided in Figure 3, the milk tube connector nipples on the lid 27 are preferably arranged in an arc which comprises less than a semi-circle, in a manner used in commercial embodiments of a suspended milker of the kind built under McCornack Patent 1,859,213; and the point of connection is preferably, although not necessarily, approximately on the chord of this arc and at the center thereof, so that the desired downward and forward pull will be distributed as uniformly as possible between the various teats.

The arm 25 has sufficient springiness to permit it to be moved up and down, and to yield as may be desired, under the effect of the power means to be described; but it is strong enough that in the event the teats are accidentally or intentionally freed from the teat cup assemblies, and these are dropped down, they will be supported from dropping to the floor by the holding action of the support apparatus.

The power operated means for providing the desired live action is here illustrated, as may be best seen in Figure 4, as a vacuum cylinder 36 having therein a piston 37 connected by a rod 38 to a clamp member 39 gripping a portion of the arm 25. The bottom of the vacuum cylinder 36 is connected through a vacuum hose 40 to another connector nipple provided on the pulsator 29, this being open to the same period of alternate vacuum and air pressure as is applied through the four normal nipples to the space within the teat cup shell assembly. Thus each time vacuum is admitted between the shells and inflation vacuum is also admitted to the bottom of the cylinder 36 and the outer end 25b of the second support arm member is pulled downwardly by the action of the power cylinder. Since this point of movement is about a center considerably forward of the udder, and since the spring 45 is continuously urging the supporting apparatus forwardly of the cow, the intermittent pull is both downward and forward to an amount largely determined by the force of this spring 45, which may be adjustable in the manner illustrated in my said Reissue Patent No. 22,368.

While the spring thus urging the supporting arrangement forwardly of the cow during milking, here identified as the spring 45, is not of itself new, the improved supporting arm arrangement and power actuation thereof here first disclosed cooperate with such a general supporting arrangement and actuating spring to provide a greatly improved action during milking, providing action similar to that heretofore achieved only with a suspended bucket type of milker. The amount of downward tug desired can be regulated by the amount of vacuum admitted through the hose 40 upon each operation of the pulsator, by the length of movement permitted the piston 37 in the cylinders 36, and by the vertical position of the mounting member 21; and the amount of forward component can be regulated by adjustment of the spring 45, as more fully described in my above mentioned patent. The combination thus provides a supporting arrangement with a tug and pull of the desired type during milking, with a relationship between the downward and forward components thereof which may be adjusted as desired, and with the advantage of supporting the milking apparatus at all times and preventing it from dropping to the floor between milking periods while cows are moving in and out of the stall, or in the event of accidental disengagement of the teat cup assemblies from the teats during milking of a given cow.

I prefer to have the vacuum admitted beneath the piston 37 in the manner illustrated in Figure 4, since in this arrangement the downward pull on the teat cup assemblies is exerted at the same time that the inflations are being expanded within the shell, at which time the steady vacuum existing within the bowl 26 of the milking apparatus and effective through the milk tubes to the interior of the inflation might otherwise cause creeping.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A supporting arrangement for a milking apparatus including a relatively rigid structure and a milk-receiving device having attached thereto cups adapted to receive the teats to be milked, comprising: a yieldable arm member horizontally pivoted to a relatively rigid support on said structure and having a free end operably connected to and supporting the device and of a strength sufficient to support the device when the cups are disconnected from the teats; and intermittently operated motor means connected to a relatively rigid part of said structure and to the arm and acting through at least a portion of the yieldable part of the arm member for periodically and intermittently exerting a pull on said device and thus on said teats.

2. In a stall structure, a supporting arrangement for a milking apparatus including a milk-receiving device having attached thereto cups adapted to receive the teats to be milked, comprising: a relatively rigid first arm member pivotally mounted at one end on said stall structure about a substantially vertical axis; a second arm member having one end pivotally connected to the other end of said first arm member, at least the other end of said second arm member being yieldable and connected to the milk-receiving device, said yieldable end being of a strength to support the device when the cups are disconnected from the teats; and intermittently operated motor means connected to said yieldable arm member and to a relatively rigid member and acting through at least a portion of the yieldable part of the arm member for periodically and intermittently exerting a pull on said device and thus on said teats.

3. In a stall structure, a supporting arrangement for a milking apparatus including a milk-receiving device having attached thereto cups adapted to receive the teats to be milked, comprising: a relatively rigid first arm member pivotally mounted at one end on said stall structure about a substantially vertical axis; a second arm member having one end pivotally connected to the other end of said first arm member, at least the other end of said second arm member being yieldable and connected to the milk-receiving device, said yieldable end being of a strength to support the device when the cups are disconnected from the teats; and intermittently operated motor means carried by said first arm member and connected to said second arm member at a point removed from its pivotal mounting for periodically and intermittently moving said other end of the second arm to exert a pull on said teats.

4. Apparatus of the character claimed in claim 1, wherein said intermittently operated motor means is a vacuum cylinder actuated by and in accordance with the intermittent vacuum applied to the teat cups.

5. Apparatus of the character claimed in claim 3, wherein said intermittently operated motor means is a vacuum cylinder actuated by and in accordance with the intermittent vacuum applied to the teat cups.

6. In a stall structure, a supporting arrangement for a milking apparatus including a milk-receiving device having attached thereto cups adapted to receive the teats to be milked, comprising: a relatively first arm member pivotally mounted at one end on said stall structure about a substantially vertical axis; a second arm member having one end pivotally connected to the other end of said first arm member, said second arm member being reversely bent and of yieldable spring material of a strength sufficient to support the device when the cups are disconnected from the teats, the other end of the second arm member being connected to said milk-receiving device; and intermittently operated motor means connected between said arm members for periodically and intermittently moving said other end of the second arm to exert a pull on said teats.

7. A supporting arrangement for a milking apparatus including a milk-receiving device having attached thereto cups adapted to receive the teats to be milked, adapted to be mounted in a stall structure, comprising: a relatively rigid first arm member pivotally mounted at one end about a susbtantially vertical axis; spring means connected to said arm and to a relatively rigid part of the structure for continuously urging the other end of this arm toward the front of the animal being milked; a second arm member having one end pivotally connected to the other end of said first arm member, said second arm member being reversely bent and of yieldable spring material of a strength sufficient to support the device when the cups are disconnected from the teats, the other end of the second arm member being connected to said milk-receiving device; and a vacuum cylinder carried by said first arm member and connected to said second arm member at a point removed from its pivotal mounting and actuated by and in accordance with the intermittent vacuum applied to the teat cups for moving said other end of the second arm to exert a pull on said teats.

8. Apparatus of the character claimed in claim 2, wherein the connection to said milk-receiving device has universal but limited movement.

9. Apparatus of the character claimed in claim 2, wherein the teat cups are connected to the milk-receiving device substantially in an arc of length substantially less than a semi-circle and the connection of the arm is substantially on the chord of said arc.

HENRY B. BABSON.

REFERENCES CITED

The following references are of record in the file of this patent:

UNITED STATES PATENTS

| Number | Name | Date |
|---|---|---|
| 814,212 | Hutchinson | Mar. 6, 1906 |
| 827,311 | Hutchinson | July 31, 1906 |
| 876,598 | Sharples | Jan. 14, 1908 |
| 1,408,326 | Wilmotte | Feb. 28, 1922 |
| 1,859,214 | McCornack | May 17, 1932 |
| 2,136,228 | Babson et al. | Nov. 8, 1938 |
| 2,483,516 | Babson | Oct. 4, 1949 |
| 2,543,162 | Floerke | Feb. 27, 1951 |